United States Patent [19]

Kitai et al.

[11] 4,350,427
[45] Sep. 21, 1982

[54] ELECTROMAGNETIC SHUTTER RELEASE DEVICE FOR CAMERAS

[75] Inventors: Kiyoshi Kitai; Yukio Morino; Shogo Kato; Masanori Watanabe, all of Shikawatashi, Japan

[73] Assignee: Seiko Koki Kabushiki Kaisha, Tokyo, Japan

[21] Appl. No.: 38,247

[22] Filed: May 11, 1979

[30] Foreign Application Priority Data

May 29, 1978 [JP] Japan .................... 53-63974

[51] Int. Cl.³ .................... G03B 9/64; G03B 7/08
[52] U.S. Cl. .................... 354/238; 354/29; 354/51
[58] Field of Search ............ 354/602, 238, 267, 29, 354/51, 258

[56] References Cited

U.S. PATENT DOCUMENTS 3,718,077  2/1973  Ono .................... 354/238 X

*Primary Examiner*—L. T. Hix
*Assistant Examiner*—Thomas H. Tarcza

*Attorney, Agent, or Firm*—Robert E. Burns; Emmanuel J. Lobato; Bruce L. Adams

[57] ABSTRACT

An electromagnetic shutter release device is provided with an electromagnet including an armature. A control circuit including two delay circuits are connected to the electromagnet for energizing same for a first period upon the initiation of the shutter release operation and thereafter energizing same for a second period upon the initiation of the exposure operation. The armature is mounted for movement to a first position during the first period, movement into a second position between the first and second periods and maintaining of same in the second position in the second period and into a third position after the second period. The movement of the armature from the first to the second position initiates the exposure operation and the movement of the armature from the second to the third position initiates the aperture closing operation which in turn begins the energization of the electromagnet during the second period whereupon the armature is maintained in position. As a result, a device is obtained which is technically and economically advantageous since it uses a single electromagnetic assembly for two purposes.

6 Claims, 3 Drawing Figures

ELECTROMAGNETIC SHUTTER RELEASE DEVICE FOR CAMERAS

BACKGROUND OF THE INVENTION

This invention relates generally to an electromagnetic shutter release device for cameras and more particularly to an electromagnetic shutter release device having an armature adapted to slide in two steps relative to the yolk of an exposure control electromagnet and arranged to start exposure at the first step and to start aperture closing at the second step.

Up to the present time, it has been usual to provide a camera having an electric shutter which electrically controls exposure operation with an additional electromagnet for starting the exposure operation by electromagnetic release motion independently of an exposure control electromagnetic device. This duplicative provision of electromagnetic devices requires an increased number of parts and a complicated mechanism resulting in a costly device. On the other hand, a method employing a single electromagnetic device has been introduced. In this method, the exposure operation is started by the electromagnetic release while the armature is attracted to the yolk and kept in position when the electromagnetic device is energized, then the aperture closing operation is started after a fixed period of time by releasing the armature from the yolk by deenergizing the electromagnetic device. However, this method has a practical disadvantage that the electromagnetic device requires an intensive electric current to attract the armature to the yolk.

SUMMARY OF THE INVENTION

Accordingly, the object of this invention is to provide an electromagnetic shutter release device of simple mechanism with high reliability and capable of controlling the shutter operation requiring a reduced electric current.

According to the present invention, the object of the invention is attained by an electromagnetic shutter release device as described hereinafter.

An exposure control circuit and an electromagnetic release circuit are connected to a single electromagnetic assembly. The electromagnetic assembly is provided with an armature which is successively slidably shifted to a first position, a second position and then to a third position. At the initial stage of the release operation, the electromagnetic release circuit is excited so that the electromagnetic is energized and attracts and keeps the armature at the first position. As the release operation proceeds, a delay circuit connected to the electromagnetic release circuit is started. The delay circuit inverts and interrupts the output of the electromagnetic release circuit after a fixed period of time to deenergize the electromagnet so that the armature is allowed to shift from the first position to the second position where a detaining lever detains the armature temporarily. The movement of the armature from the first position to the second position initiates the exposure operation by actuating the electromagnetic release circuit. At the initial stage of the exposure operation, the exposure control circuit is started and the electromagnet is energized again to attract the armature at the position where the armature is previously detained by the detaining lever, then the detaining lever is retracted out of the operating range of the armature. After a fixed delay time controlled by the resistance of photoelectric cells and a condenser, the output of the exposure control circuit is inverted and interrupted to deenergize the electromagnet so that the armature is released and allowed to shift to the third position while intitiating the aperture closing operation.

DETAILED DESCRIPTION OF THE INVENTION

Referring now to the attached drawings, an explanation will be given of a preferred embodiment according to the present invention.

Figure 1:
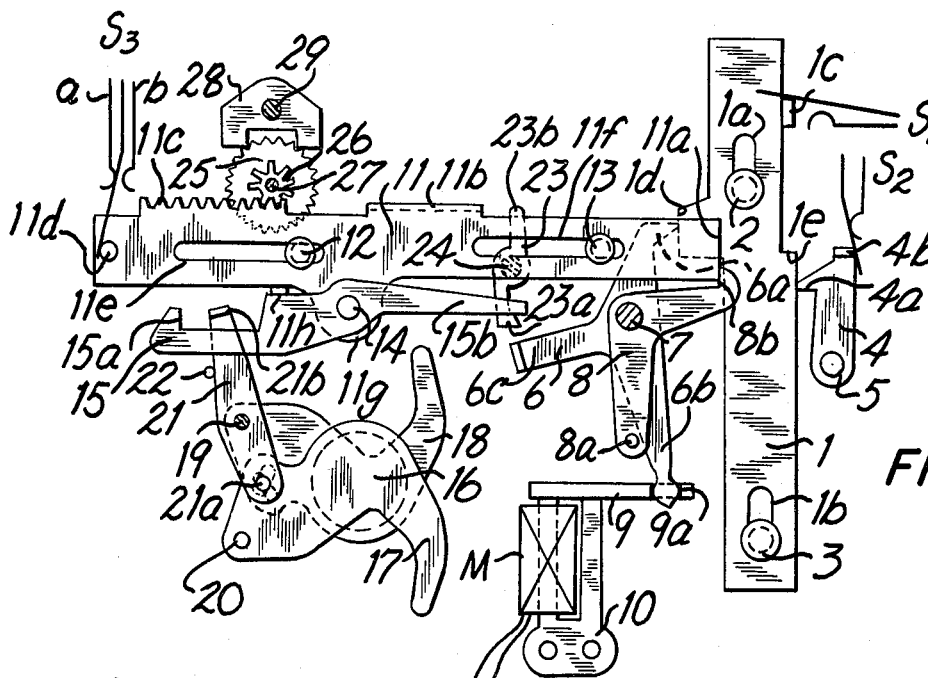
FIG. 1 illustrates a shutter assembly, according to the present invention, in the charged state.

Referring to FIG. 1, a release plate (1) is movably guided by pins (2) and (3) fitted in slots (1a) and (1b), respectively, so as to vertically reciprocate and is urged upwards by a spring (not shown). The release plate (1) has a raised part (1c) for operating a switch, $S_1$ a protrusion (1d) and a shoulder (1e) for engaging with a hook (4a). A detainer (4) having the hook (4a) and a raised part (4b) for operating a switch (S2) is urged counterclockwise about a pivot (5) by a spring (not shown). An operating lever (6) having an arm (6a), an armature operating arm (6b) and a detaining arm (6c) is urged clockwise about a pivot (7) by a spring (not shown). A starting lever (8) having a pin (8a) and a hook (8b) is pivoted about the common pivot (7) and is connected with the operating lever (6) by a spring (not shown) provided between the operating lever (6) and the starting lever (8) so as to keep the pin (8a) in contact with the operating lever (6) at the arm (6b). An armature (9) has a slot (9a) engaging with the arm (6b) of the operating lever (6). Reference numeral (10) indicates a yolk of the electromagnet. A driving plate (11) having an end (11a), a raised part (11b), gear teeth (11c) and a pin (11d) is laterally slidable, being guided by pins (12) and (13) fitted in slots (11e) and (11f), respectively, and is urged rightwards by a spring (not shown). A driving lever (15) having a hook (15a) and an arm (15b) is rotatably supported on the arm (11g) of the driving plate (11) by a pin (14) and is urged clockwise by a spring (not shown) and resting on a raised part (11h) of the driving plate (11). Reference numeral (16) indicates the aperture of the shutter. Shutter blades (17) and (18) commonly functioning as aperture blades reciprocate about fixed pins (20) and (19), respectively, being controlled by a pin (21a) of a shutter blade control lever (21) to open and close the aperture (16). The shutter blade control lever (21) is reciprocable about the pin (19) and is urged counterclockwise by a spring (not shown). A locating pin (22) defines the position of the shutter blade control lever (21). A detaining lever (23) having a detaining part (23a) and an arm (23b) is pivoted about a pivot (24) and is urged counterclockwise by a spring (not shown) and is resting on a limiting pin (not shown). An escape wheel (25) having in one body a gear wheel (26) engaging with the gear teeth (11c) of the driving plate (11) is rotatable about a shaft (27). Reference numerals (28) and (29) indicate an anchor and its pivot, respectively.

Figure 3:
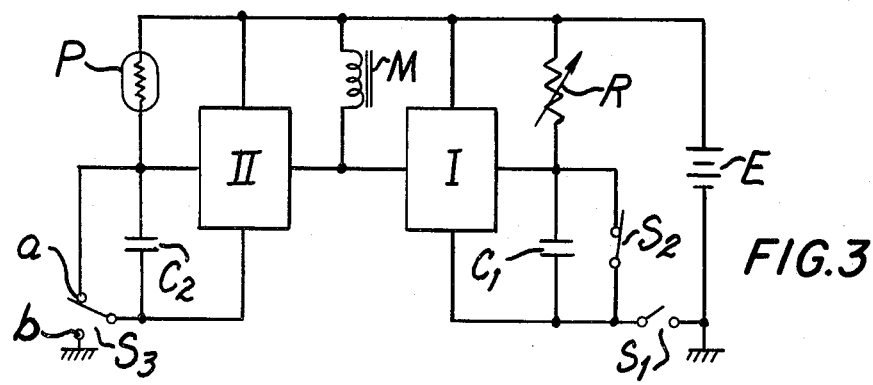
FIG. 3 is a schematic illustration of the control circuit for the shutter according to the present invention.

Referring now to FIG. 3, the shutter release control circuit comprises a power source (E), a main switch (S1), a release operation initiating switch (S2), an exposure control changeover switch (S3), an electromagnetic release control module (I), an exposure control module (II), a variable resistance (R), a photoelectric cell (P), condensers (C1) and (C2) and an electromagnet (M).

Figure 2:
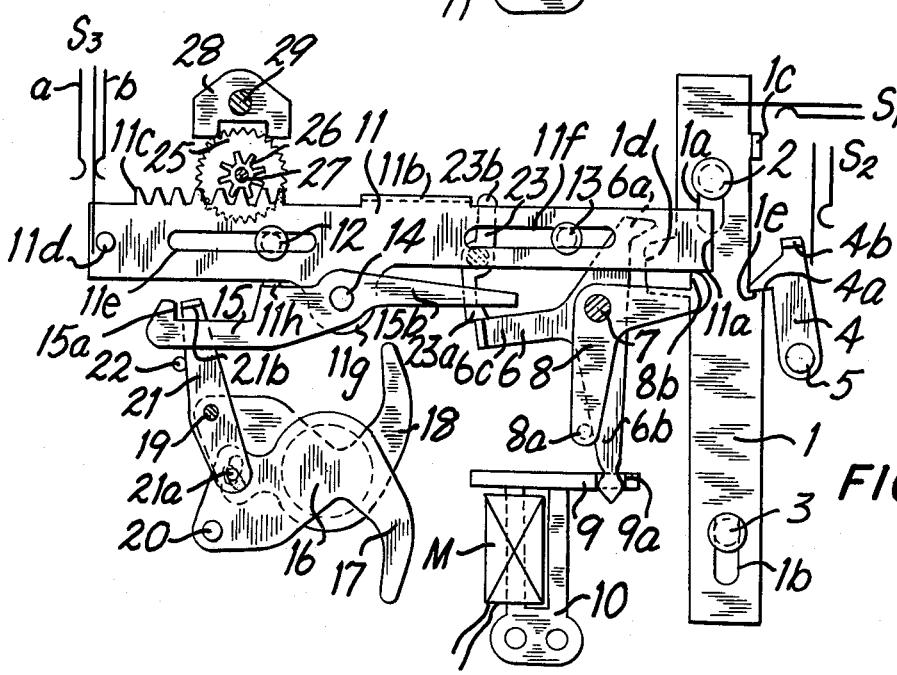
FIG. 2 illustrates a shutter assembly according to the present invention in the state immediately after the shutter has been electromagnetically released.

The manner of operation of the various parts described in connection with the drawings will be explained with reference to the drawings. As the release plate (1) is depressed starting from the charged state as shown in FIG. 1, first the switch (S1) is closed to energize the electromagnet (M) so that the armature (9) is attracted to the yolk (10) to hold the operating lever (6) at the position as illustrated in FIG. 1. As the release plate (1) is depressed further, and immediately after the protrusion (1d) and the arm (6a) of the operating lever (6) disengage from each other, the hook (4a) of the detainer (4) engages with the shoulder (1e) to arrest the release plate (1) so as not to be returned upwards by a spring (not shown). On the other hand, counterclockwise turning of the detainer (4) causes the switch (S2) to open to start the electromagnetic release control module (I). After a fixed period of time determined by the resistance (R) and the condenser (C1), the output of the electromagnetic release control module (I) is inverted so that the electromagnet (M) is deenergized to cancel the attraction of the armature (9) to the yolk (10). Consequently, the operating lever (6) engaging with the armature (9) is allowed to turn about the pivot (7) until the operating lever (6) is detained by the detaining part (23a) of the detainer (23) at the arm (6c). At the same time, pivoted on the common pivot (7) and connected by a spring (not shown), the starting lever (8) turns clockwise in one body with the operating lever (6), then the hook (8b) retracts from the end (11a) of the driving plate (11), consequently, the driving plate (11) starts travelling rightwards being pulled by a spring (not shown) at a speed controlled by the escape wheel (25) and the anchor (28). At the initial stage of the travel, switch contact of the changeover switch (S3) is changed from the terminal (a) to the terminal (b). FIG. 2 illustrates the state immediately after the switch contact of the changeover switch (S3) has been changed. The changeover of the changeover switch (S3) excites the exposure control module (II) and the electromagnet (M) and starts the time constant circuit consisting of the condenser (C2) and the resistance of the photoelectric cell (P) determined depending on the brightness of the field. When the electromagnet (M) is excited, the yolk (10) attracts the armature (9) again so that the clockwise turn of the operating lever (6) is interrupted. As the driving lever (11) travels further rightwards, the raised part (11b) pushes the detaining lever (23) at the arm (23b) to turn the detaining lever (23) clockwise about the pivot (24) so that detention of the arm (6c) of the operating lever (6) with the detaining part (23a) is cancelled. At this moment, the operating lever (6) remains still as the armature (9) remains attracted to the yolk (10). On the arm (11g) of the driving plate (11), the driving lever (15) is rotatably supported by the pin (14). The driving lever (15) travels together with the driving plate (11) with hook (15a) hooked at the raised part (21b) of the shutter blade control lever (21) so that the shutter blade control lever (21) is turned clockwise about the pivot (19) turning the shutter blades (16) and (17) with the pin (21a) to gradually open the aperture in proportion to the rightward movement of the driving lever (15). After a fixed period of time, the output of the exposure control module (II) is inverted and the electromagnet (M) is deenergized to release the armature (9), then the armature (9) slides leftwards causing the operating lever (6) to turn clockwise. The arm (6c) hits against the arm (15b) of the driving lever (15) travelling rightwards turning the driving lever (15) counterclockwise so that engagement of the hook (15a) with the raised part (21b) of the shutter blade control lever (21) is cancelled. Consequently, the shutter blade control lever (21) is allowed to be turned counterclockwise by a spring (not shown) so far that it comes to rests on the locating pin (22) while the shutter blades (16) and (17) closes the aperture to complete the exposure. The driving plate (11) travels further rightwards after completion of the exposure and in the final stage of its travel, pushes the detainer (4) at the raised part (4b) turning the detainer (4) clockwise to cancel the engagement of the hook (4a) with the shoulder (1e) of the release plate (1) so that the release plate (1) is allowed to return to its starting position. The shutter device is recharged by moving the driving plate (11) leftwards so far that the driving plate (11) is detained by the hook (8b) of the starting lever (8).

As explained above, according to the present invention, the armature is adapted to slide in two steps relative to the yolk of the electromagnet. With the armature at the first step, the shutter release operation is controlled to start exposure and with the armature at the second step, the shutter blade closing operation is controlled to complete exposure. Thus the present invention is technically and economically advantageous as a single electromagnetic assembly is used for two purposes. Furthermore, the present invention advantageously simplifies the mechanism of the shutter because the armature only slides relative to the yolk requiring no complicated mechanism, such as a mechanism to press the armature against and to separate same from the yolk, which is necessary for the conventional shutter wherein the armature is pressed against and separated from the yolk during the exposure operation.

As illustrated in FIG. 3, a variable resistance (R) is provided for the control circuit of the present invention, therefore, the time constant determined by the resistance (R) and the condenser (C1) is adjustable. With the variable resistance (R) adjusted to provide a time constant of 10 seconds, the circuit may function as a selftimer. With the variable resistance (R) adjusted to provide a time constant of 1 to 3 seconds, camera "shake" may be prevented. When the variable resistance (R) is adjusted to the zero position, shutter release operation directly initiates exposure. This direct initiation of exposure is possible also by leaving the main switch (S1) opened to keep the electromagnetic releas control module (I) deenergized. In the description of the preferred embodiment according to the present invention, explanation has been made with reference to a program shutter wherein exposure is performed by the shutter blades which are commonly functioning as aperture blades, however, in modifications, aperture blades may be separately provided and the shutter blades may be controlled to perform the aperture opening operation corresponding to sliding motion of the armature to the first position and to perform aperture closing operation corresponding to sliding motion of the armature to the second position.

Obviously many modifications and variations of the present invention are possible in the light of the above teachings. It is therefore to be understood that within the scope of the appended claims, the invention may be practiced otherwise than as specifically described.

What I claim is:

1. An electromagnetic shutter release device for use in taking an exposure comprising: a first delay circuit energized in response to initiation of the shutter release operation; a second delay circuit energized in response to initiation of the exposure operation; an electromagnet connected to said first and second delay circuits for energization in response to energization of said first and second delay circuits; an armature; means mounting the armature for movement to a first position by said electromagnet which is energized at the start of operation of said first delay circuit, for movement from the first position to a second position when said electromagnet is denergized at completion of operation of said first delay circuit and attracted at the second position when said electromagnet is energized at the start of operation of said second delay circuit, and for movement from the second position to a third position when said electromagnet is denergized at completion of operation of said second delay circuit, said means including a detaining member for detaining said armature at the second position, and a driving member for first changing the connection of said electromagnet from said first delay circuit to a connection to said second delay circuit and then canceling the detaining of said armature by said detaining member while starting the exposure operation; and wherein said driving member is started by the movement of said armature from said first position to said second position, and the aperture closing operation is started by the movement of said armature from said second position to said third position.

2. An electromagnetic shutter release device for use in taking an exposure comprising: an electromagnet including a movable armature operative when energized to attract and immovably hold the armature; circuit means connected to the electromagnet for energizing the electromagnet for a first time period upon initiation of the shutter release operation and thereafter energizing the electromagnet for a second time period upon initiation of the exposure operation; means for effecting movement of the armature in one direction to a first position no later than the start of the first time period, for effecting further movement of the armature in said one direction to a second position between the first and second time periods and for maintaining the armature in the second position in the second time period, and for effecting further movement of the armature in said one direction to a third position after elapse of the second time period; means responsive to the movement of the armature from the first to the second positions for initiating the exposure operation; and means responsive to the movement of the armature from the second to the third positions for initiating the aperture closing operation.

3. The device according to claim 2; wherein the means initiating the exposure operation comprises a slidable driving plate movable in response to the movement of the armature from the first to the second position to initiate the exposure operation.

4. The device according to claim 2 or 3; wherein said circuit means includes a first control module switchable to on and off states and connected to the electromagnet and operative when switched on to maintain the electromagnet energized for said first time period, and a second control module switchable to on and off states and connected to the electromagnet and operative when switched on to maintain the electromagnet energized for said second time period.

5. The device according to claim 4; wherein said circuit means includes means coacting with said second control module for setting said second time period in dependence on the brightness of the object field whose exposure is being taken.

6. A device according to claim 4; wherein said circuit means includes a change-over switch connected to said second control module and having one switching state wherein said second control module is switched off and another switching state wherein said second control module is switched on, and wherein said change-over switch is positioned relative to said driving plate such that sliding movement of said driving plate in response to movement of the armature from the first to the second position effects switching of said change-over switch from said one to another switching state thereby switching on said control module.

* * * * *